United States Patent [19]

Saito et al.

[11] Patent Number: 6,024,900
[45] Date of Patent: Feb. 15, 2000

[54] PROCESS FOR PRODUCTION OF A CARBON COMPOSITE MATERIAL

[75] Inventors: Kazuo Saito; Atsushi Hagiwara; Fumio Tanno, all of Tokyo, Japan

[73] Assignee: Nisshinbo Industries, Inc., Tokyo, Japan

[21] Appl. No.: 09/069,099

[22] Filed: Apr. 29, 1998

Related U.S. Application Data

[62] Division of application No. 08/651,561, May 22, 1996, Pat. No. 5,776,372.

[30] Foreign Application Priority Data

May 29, 1995 [JP] Japan .................................... 7-155190

[51] Int. Cl.$^7$ ..................................................... C01B 31/00
[52] U.S. Cl. ........................... 264/29.6; 264/85; 264/105; 264/126; 264/241; 264/347
[58] Field of Search ................................. 264/29.1, 29.6, 264/85, 109, 125, 126, 241, 345, 104, 105, 122, 347

[56] References Cited

U.S. PATENT DOCUMENTS

| | | |
|---|---|---|
| 4,199,628 | 4/1980 | Caines . |
| 4,530,949 | 7/1985 | Atkinson et al. . |
| 4,855,092 | 8/1989 | Fukuda et al. . |
| 4,971,726 | 11/1990 | Maeno et al. . |
| 5,128,209 | 7/1992 | Sakai et al. . |
| 5,645,925 | 7/1997 | Sheppard et al. . |
| 5,653,918 | 8/1997 | Towlson . |
| 5,656,344 | 8/1997 | Sawa et al. . |
| 5,656,690 | 8/1997 | Pradl et al. . |
| 5,688,862 | 11/1997 | Kondou et al. . |
| 5,693,741 | 12/1997 | Sheppard et al. . |

*Primary Examiner*—Jan H. Silbaugh
*Assistant Examiner*—Kenneth M. Jones
*Attorney, Agent, or Firm*—Kubovcik & Kubovcik

[57] ABSTRACT

The present invention provides a carbon composite material which is a molded material comprising (a) an expanded graphite powder and (b) a thermoplastic resin or a thermosetting resin or a fired product of the thermosetting resin, and the expanded graphite powder (a) being dispersed in the component (b), wherein the expanded graphite powder has an average particle diameter of 5–12 $\mu$m and at least 80% of the total particles of the expanded graphite powder have particle diameters of 0.1–20 $\mu$m; and a process for producing a carbon composite material, which comprises mixing and dispersing a thermoplastic or thermosetting resin and the expanded graphite powder as mentioned above, and then pressure-molding the resulting mixture at room temperature to 400° C., or a process for producing a carbon composite material, which comprises mixing and dispersing a thermosetting resin and the expanded graphite powder as mentioned above, pressure-molding the resulting mixture at room temperature to 400° C., and firing the resulting molding at 700–3,000° C. in a non-oxidizing atmosphere. The carbon composite material produced by the above process is free from the problems of the prior art and is superior in both gas non-permeability and electroconductivity.

5 Claims, No Drawings

PROCESS FOR PRODUCTION OF A CARBON COMPOSITE MATERIAL

This application is a division of application Ser. No. 08/651,561, filed May 22, 1996 U.S. Pat. No. 5,776,372.

BACKGROUND OF THE INVENTION (1) Field of the Invention

The present invention relates to a carbon composite material having gas non-permeability and high electroconductivity, as well as to a process for production thereof.

(2) Description of the Prior Art

Carbon materials having gas non-permeability find main applications such as member for heat exchanger, material go for semiconductor production, part of fuel battery, and the like. Gas non-permeable carbon materials of low cost and excellent performance have been desired.

Gas non-permeable carbon materials have heretofore been produced by, for example, (1) a process which comprises impregnating a carbon material such as glassy carbon sheet, graphite or the like with a thermosetting resin [Japanese Patent Application Kokai (Laid-Open) No. 153877/1990], (2) a process which comprises coating an expanded graphite molded material with a resin and firing the coated molded material up to about 2,0000° C. in an inert gas atmosphere [Japanese Patent Application Kokai (Laid-Open) No. 127284/1985], or (3) a process which comprises impregnating an expanded graphite molded material with a thermosetting resin and hot-pressing the impregnated molded material [Japanese Patent Application Kokai (Laid-Open) No. 12672/1985].

The above processes (1) to (3), however, each have problems. In the process (1), the glassy carbon sheet, although having sufficient gas non-permeability and electroconductivity, takes time in firing and invites a high cost and, moreover, is unable to produce a material of complicated shape. In the process (2) which comprises coating expanded graphite with a thermosetting resin and firing the coated expanded graphite in an inert gas, the necessity of the coating step makes the process complicated and, moreover, formation of a carbon layer having no pinhole is very difficult and no sufficient gas non-permeability can be obtained. In the process (3) which comprises impregnating an expanded graphite sheet with a resin, the necessity of the impregnation step makes the process complicated and, moreover, no sufficient gas non-permeability is achieved.

In order to solve these problems, there were proposed, for example, (4) a process which comprises placing an expanded graphite powder and an organic binder in a solvent, drying and grinding the resulting mixture to form secondary particles consisting of an expanded graphite powder and an organic binder, and molding the secondary particles to form an expanded graphite molded material [Japanese Patent Application Kokai (laid-open) No. 32517/1979] and (5) a process which comprises mixing expanded graphite and an organic binder and molding the resulting mixture [Japanese Patent Application Kokai (laid-Open) Nos. 49656/1983, 254363/1987 and 154467/19891].

Expanded graphite of ordinary use, however, has no good miscibility with organic binder. Use of a large amount of expanded graphite for high electroconductivity results in insufficient gas non-permeability. Use of a small amount of expanded graphite for high gas non-permeability results in insufficient electroconductivity. Thus, development of a carbon material having both high gas non-permeability and electroconductivity has been desired.

OBJECT AND SUMMARY OF THE INVENTION

The objects of the present invention are to solve the above-mentioned problems of the prior art and provide a carbon composite material having both gas non-permeability and electroconductivity and a process for production thereof.

In order to achieve the above objects, the present inventors made a study and found out that expanded graphite having particular particle diameters has good miscibility with thermosetting or thermoplastic resins. The present inventors made a further study based on an idea that a molded material consisting of expanded graphite of particular particle diameters and a thermoplastic or thermosetting resin might have excellent gas non-permeability and electroconductivity. As a result, the present invention has been completed.

According to the present invention, there is provided a carbon composite material which is a molded material comprising (a) an expanded graphite powder and (b) a thermoplastic resin or a thermosetting resin or a fired product of the thermosetting resin, and the expanded graphite powder (a) being dispersed in the component (b), wherein the expanded graphite powder has an average particle diameter of 5–12 $\mu$m and at least 80% of the total particles of the expanded graphite powder have particle diameters of 0.1–20 $\mu$m.

According to the present invention, there is further provided a process for producing a carbon composite material, which comprises mixing and dispersing a thermoplastic or thermosetting resin and an expanded graphite powder, said expanded graphite powder having an average particle diameter of 5–12 $\mu$m and at least 80% of the total particles of said expanded graphite powder having particle diameters of 0.1–20 $\mu$m, and then pressure-molding the resulting mixture at room temperature to 400° C., or a process for producing a carbon composite material, which comprises mixing and dispersing a thermosetting resin and an expanded graphite powder, said expanded graphite powder having an average particle diameter of 5–12 $\mu$m and at least 80% of the total particles of said expanded graphite powder having particle diameters of 0.1–20 $\mu$m, pressure-molding the resulting mixture at room temperature to 400° C., and firing the resulting molding at 700–3,000° C. in a non-oxidizing atmosphere.

DETAILED DESCRIPTION OF THE INVENTION

The present invention is hereinafter described in detail.

The expanded graphite used in the present invention has no particular restriction as to the raw material. The raw material can be any raw material ordinarily used in production of expanded graphite, such as natural graphite, pyrolytic graphite, Kish graphite or the like.

Production of expanded graphite from the above raw material can be conducted by a known process. For example, concentrated sulfuric acid is mixed with hydrogen peroxide to form peroxomonosulfuric acid; thereto is added raw material graphite with stirring to give rise to a reaction for about 1 hour to 1 day; and the reacted graphite is heated at 500–1,000° C. in an inert gas.

Incidentally, the expanded graphite used in the present invention may be expanded graphite obtained by adding, in the above production of expanded graphite using concentrated sulfuric acid and hydrogen peroxide, at least one oxidizing agent selected from perchloric acid, a perchloric acid salt and ammonium hydrogenperoxodisulfate [Japanese Patent Application Kokai (Laid-Open) No. 16406/1994]. It specifically is expanded graphite obtained by adding 15% ammonium hydrogenperoxodisulfate to a mixture of 320 parts by weight of 95 wt. % concentrated sulfuric acid and 4 parts by weight of 62% hydrogen peroxide, mixing them with cooling to 20° C. or lower, adding natural graphite to the mixture to give rise to a reaction for 24 hours, and firing the reaction product up to 1,000° C. in nitrogen gas.

The expanded graphite produced as above is ground and as necessary allowed to have a desired particle size distribution and desired particle diameters. The expanded graphite used in the present invention must have an average particle diameter of 5–12 $\mu$m and at least 80% of the total particles of the graphite powder must have particle diameters of 0.1–20 $\mu$m.

When the average particle diameter of the expanded graphite used in the present invention is smaller than 5 $\mu$m, the penetration of the thermoplastic or thermosetting resin into the gap between expanded graphite particles in a following mixing step is difficult, resulting the carbon composite material of very low gas non-permeability. When the average particle diameter is larger than 12 $\mu$m, the filling of the gap between expanded graphite particles, with the thermoplastic or thermosetting resin is insufficient, resulting the carbon composite material of (1) very low gas non-permeability and (2) reduced packing density which invites insufficient electrical connection and consequent low electroconductivity.

Further, it is necessary that at least 80% of the total particles of the graphite powder used in the present invention have particle diameters of 0.1–20 $\mu$m. In general, expanded graphite which is ground and as necessary allowed to have a desired particle size and desired particle diameters, has a particle size distribution wherein the average particle diameter gives a distribution peak. In the present expanded graphite, however, when its powder total particles are measured for particle size distribution, it is necessary that at least 80% of at the powder total particles have particle diameters of 0.1–20 $\mu$m and less than 20% of the powder total particles have particle diameters of smaller than 0.1 $\mu$m or larger than 20 $\mu$m.

Needless to say, in the present expanded graphite, the total powder particles may have particle diameters of 0.1–20 $\mu$m or of even narrower range.

When the peak of particle size distribution is lower, the total number of particles having particle diameters smaller than 0.1 $\mu$m and larger than 20 $\mu$m increases. When the peak of particle size distribution moves to either one direction, the number of graphite particles having particle diameters smaller than 0.1 $\mu$m or larger than 20 $\mu$m increases. When the number of particles having particle diameters smaller than 0.1 $\mu$m increases, the surface area of the expanded graphite powder increases, whereby the thickness of the resin present between the expanded graphite particles becomes smaller and the resulting composite material has reduced gas non-permeability. When the number of graphite particles having particle diameters larger than 20 $\mu$m increases, part of the graphite particles may be exposed at the surface of the resulting composite material and the number of resin layers formed between the expanded graphite particles is small, giving a composite material of low gas non-permeability.

The above-mentioned grinding of expanded graphite may be conducted by any known method such as mixer, jet mill, ball mill, pin mill, freeze-grinding or the like. Allowing ground expanded graphite to have a desired particle size distribution and desired particle diameters can be conducted by a sieving method such as vibratory screen, vibration screener, sonic sifter, microclassifier, forced vortex air classifier or the like.

The thermoplastic resin used in the present invention is not particularly restricted and includes known resins such as polyethylene, polystyrene, polypropylene, polymethyl methacrylate, polyethylene terephthalate, polybutylene terephthalate, polyethersulfone, polycarbonate, polyoxamethylene, polyamide, polyimide, polyamideimide, polyvinyl alcohol, polyvinyl chloride, fluororesin, polyphenylsulfone, polyether ether ketone, polysulfone, polyether ketone, polyarylate, polyetherimide, polymethylpentene and the like.

The thermosetting resin used in the present invention is not particularly restricted and includes known resins such as polycarbodiimide resin, phenolic resin, furfuryl alcohol resin, cellulose, epoxy resin, urea resin, melamine resin and the like.

The thermosetting resin or the thermoplastic resin may be used in the form of a powder or a solution in an appropriate solvent.

The carbon composite material of the present invention can be produced by making the main components, i.e. an expanded graphite powder and a resin into a composite material according to the following process. That is, first an expanded graphite powder and a resin both mentioned above are mixed and dispersed to obtain a mixture. This mixing step can be conducted by an ordinary industrial method such as stirring rod, kneader, ball mill, sample mill, mixer, static mixer, ribbon mixer or the like. In this case, the mixture may be subjected to granulation for improved moldability.

The amount ratio of expanded graphite and the resin can be determined depending upon, for example, the properties required for intended carbon composite material. The amount ratio can be, for example, 10–1,000 parts by weight of the resin per 100 parts by weight of expanded graphite powder. When the amount of the resin is less than 10 parts by weight, the resulting composite material has a reduced strength and reduced gas non-permeability. When the amount of the resin is more than 1,000 parts by weight, the resulting composite material has insufficient electroconductivity.

Next, the mixture is pressurized to allow the resin component to penetrate into between the particles of the expanded graphite powder, whereby the mixture is molded to obtain a carbon composite material of the present invention. This molding can be conducted by a known method such as pressure molding hydrostatic pressure molding, extrusion molding, injection molding, belting press, press heating, roll pressing or the like. In this molding, the mixture may be molded into a desired shape; or, prior to the molding, a solvent may be added to the mixture so that the mixture can be granulated into granules of, for example, 20 $\mu$m to 2 $\mu$m in diameter for higher moldability.

The molding temperature can be appropriately selected depending upon the kind of the resin used, but is ordinarily room temperature to 400° C. After the molding, a heat-treatment may be applied to chemically stabilize the molded material.

With respect to the above mixture between expanded graphite and resin, the mixture between expanded graphite and thermosetting resin can be fired in a non-oxidizing atmosphere. The firing temperature is 700–3,000° C., preferably 1,000–2,500° C. in a non-oxidizing atmosphere. When the firing temperature is lower than 700° C., the resulting composite material has no electroconductivity noticeably higher than that of the molded composite material not subjected to firing. A firing temperature higher than 3,000° C. invites severe exhaustion of firing furnace and is not suited for practical production.

The present invention is hereinafter described in more detail by way of Examples.

EXAMPLE 1

Expanded graphite (its average particle diameter was 5 μm and at least 80% of the powder total particles had particle diameters of 0.1–20 μm) and a polycarbodiimide resin were mixed in compositions shown in Table 1. The mixtures were molded at 150° C. at a pressure of 100 kg/cm$^2$. From each molded material obtained was cut out a sheet material of 40 mm×40 mm×2 mm (thickness), and it was measured for resistivity by a four-probe method. Also, a sheet material of 120 mm×120 mm×1 mm (thickness) was cut out from each molded material and measured for nitrogen gas permeability according to the pressure difference method specified in JIS K 7126. The results are shown in Table 1.

TABLE 1

|  | Example 1 | | |
| --- | --- | --- | --- |
|  | 1-1 | 1-2 | 1-3 |
| Firing temperature |  | No firing |  |
| Expanded graphite | 100 | 100 | 100 |
| Resin |  |  |  |
| Polycarbodiimide | 10 | 100 | 1000 |
| Phenol |  |  |  |
| Polypropylene |  |  |  |
| Polytetrafluoroethylene |  |  |  |
| Resistivity (mΩ · cm) | 3 | 50 | 100 |
| Nitrogen gas permeability (cm$^3$cm$^{-2}$min$^{-1}$atm) | $1 \times 10^{-2}$ | $1 \times 10^{-5}$ | $1 \times 10^{-7}$ |

EXAMPLE 2

The same expanded graphite as used in Example 1 and a phenolic resin were mixed in compositions shown in Table 2. The mixtures were molded at 150° C. at a pressure of 100 kg/cm$^2$. The molded materials obtained were measured for resistivity and nitrogen gas permeability in the same manners as in Example 1. The results are shown in Table 2.

TABLE 2

|  | Example 2 | | |
| --- | --- | --- | --- |
|  | 2-1 | 2-2 | 2-3 |
| Firing temperature |  | No firing |  |
| Expanded graphite | 100 | 100 | 100 |
| Resin |  |  |  |
| Polycarbodiimide |  |  |  |
| Phenol | 10 | 100 | 1000 |
| Polypropylene |  |  |  |
| Polytetrafluoroethylene |  |  |  |
| Resistivity (mΩ · cm) | 5 | 82 | 120 |
| Nitrogen gas permeability (cm$^3$cm$^{-2}$min$^{-1}$atm) | $1 \times 10^{-2}$ | $5 \times 10^{-4}$ | $6 \times 10^{-6}$ |

Example 3

The same expanded graphite as used in Example 1 and a polypropylene were mixed in compositions shown in Table 3. The mixtures were molded at 180° C. at a pressure of 100 kg/cm$^2$. The molded materials obtained were measured for resistivity and nitrogen gas permeability in the same manners as in Example 1. The results are shown in Table 3.

TABLE 3

|  | Example 3 | | |
| --- | --- | --- | --- |
|  | 3-1 | 3-2 | 3-3 |
| Firing temperature |  | No firing |  |
| Expanded graphite | 100 | 100 | 100 |
| Resin |  |  |  |
| Polycarbodiimide |  |  |  |
| Phenol |  |  |  |
| Polypropylene | 10 | 100 | 1000 |
| Polytetrafluoroethylene |  |  |  |
| Resistivity (mΩ · cm) | 7 | 90 | 130 |
| Nitrogen gas permeability (cm$^3$cm$^{-2}$min$^{-1}$atm) | $2 \times 10^{-2}$ | $2 \times 10^{-5}$ | $2 \times 10^{-7}$ |

EXAMPLE 4

The same expanded graphite as used in Example 1 and a polytetrafluoroethylene were mixed in compositions shown in Table 4. The mixtures were molded at 330° C. at a pressure of 100 kg/cm$^2$. The molded materials obtained were measured for resistivity and nitrogen gas permeability in the same manners as in Example 1. The results are shown in Table 4.

TABLE 4

|  | Example 4 | | |
| --- | --- | --- | --- |
|  | 4-1 | 4-2 | 4-3 |
| Firing temperature |  | No firing |  |
| Expanded graphite | 100 | 100 | 100 |
| Resin |  |  |  |
| Polycarbodiimide |  |  |  |
| Phenol |  |  |  |
| Polypropylene |  |  |  |
| Polytetrafluoroethylene | 10 | 100 | 1000 |
| Resistivity (mΩ · cm) | 6 | 87 | 126 |
| Nitrogen gas permeability (cm$^3$cm$^{-2}$min$^{-1}$atm) | $1 \times 10^{-3}$ | $2 \times 10^{-5}$ | $2 \times 10^{-7}$ |

EXAMPLE 5

The composition shown in Example 1-2 (expanded graphite/polycarbodiimide=100 parts by weight/100 parts by weight) was molded under the same conditions as in Example 1. The molded material was fired up to a temperature shown in Table 5, in an inert gas atmosphere. The fired materials were measured for resistivity and nitrogen gas permeability in the same manners as in Example 1. The results are shown in Table 5.

TABLE 5

|  | Example 5 | | |
| --- | --- | --- | --- |
|  | 5-1 | 5-2 | 5-3 |
| Firing temperature | 1000 | 2000 | 2500 |
| Expanded graphite | 100 | 100 | 100 |
| Resin |  |  |  |
| Polycarbodiimide | 100 | 100 | 100 |
| Phenol |  |  |  |
| Polypropylene |  |  |  |
| Polytetrafluoroethylene |  |  |  |
| Resistivity (mΩ · cm) | 0.8 | 0.1 | 0.08 |
| Nitrogen gas permeability ($cm^3 cm^{-2} min^{-1} atm$) | $8 \times 10^{-6}$ | $2 \times 10^{-6}$ | $8 \times 10^{-6}$ |

Comparative Example 1

Expanded graphite (its average particle diameter was 100 μm and 20% of the powder total particles had particle diameters of 0.1–20 μm) and a polycarbodiimide resin were mixed in a composition shown in Table 6. The mixture was molded at 150° C. at a pressure of 100 kg/cm². The molded material obtained was measured for resistivity and nitrogen gas permeability in the same manners as in Example 1. The results are shown in Table 6.

Comparative Example 2

The molded material used in Comparative 1 was fired up to 1,000° C. in nitrogen gas. The fired material obtained was measured for resistivity and nitrogen gas permeability in the same manners as in Example 1. The results are shown in Table 6.

Comparative Example 3

Expanded graphite (its average particle diameter was 0.5 μm and 20% of the powder total particles had particle diameters of 0.1–20 μm) and a polycarbodiimide resin were mixed in a composition shown in Table 6. The mixture was molded at 150° C. at a pressure of 100 kg/cm². The molded material obtained was measured for resistivity and nitrogen gas permeability in the same manners as in Example 1. The results are shown in Table 6.

TABLE 6

|  | Comparative Examples | | |
| --- | --- | --- | --- |
|  | 1 | 2 | 3 |
| Firing temperature | No firing | 1000 | No firing |
| Expanded graphite | 100 | 100 | 100 |
| Resin (Polycarbodiimide) | 10 | 100 | 1000 |
| Resistivity (mΩ · cm) | 500 | 200 | 500 |
| Nitrogen gas permeability ($cm^3 cm^{-2} min^{-1} atm$) | 0.2 | 1 | 0.3 |

The carbon composite material of the present invention is a molded material of an expanded graphite powder and a thermosetting or thermoplastic resin, wherein the graphite powder has an average particle diameter of 5–12 μm and at least 80% of the powder total particles have particle diameters of 0.1–20 μm. This carbon composite material is superior in both gas non-permeability and electroconductivity.

What is claimed is:

1. A process for producing a carbon composite material consisting of (a) an expanded graphite powder and (b) a thermoplastic resin or a thermosetting resin, the expanded graphite powder (a) being dispersed in the component (b), wherein the expanded graphite powder has an average particle diameter of 5–12 μm and at least 80% of the total particles of the expanded graphite powder have particle diameters of 0.1–20 μm, and wherein said process comprises:

mixing and dispersing said thermoplastic or thermosetting resin and said expanded graphite powder, and then pressure-molding the resulting mixture at room temperature to 400° C. to form said carbon composite material.

2. A process according to claim 1, wherein an amount ratio of the expanded graphite powder and the thermosetting or thermoplastic resin is 10–1,000 parts by weight of the resin per 100 parts by weight of the graphite powder.

3. A process for producing a carbon composite material consisting of (a) an expanded graphite powder and (b) a fired product of a thermosetting resin, the expanded graphite powder (a) being dispersed in the component (b), wherein the expanded graphite powder has an average particle diameter of 5–12 μm and at least 80% of the total particles of the expanded graphite powder have particle diameters of 0.1–20 μm, and wherein said process comprises:

mixing and dispersing said thermosetting resin and expanded graphite powder, to form a resulting mixture, pressure-molding said resulting mixture at room temperature to 400° C. to form a resulting molding, and firing said resulting molding at 700–3000° C. in a non-oxidizing atmosphere to form said carbon composite material.

4. A process according to claim 3, wherein an amount ratio of the expanded graphite powder and the thermosetting is 10–1,000 parts by weight of the resin per 100 parts by weight of the graphite powder.

5. A process according to claim 3, wherein the firing in a non-oxidizing atmosphere is conducted at 1,000–2,500° C.

* * * * *